United States Patent Office

3,780,142
Patented Dec. 18, 1973

3,780,142
FLAME-RETARDANT POLYOLEFIN
COMPOSITIONS
Yoshikatsu Ogawa, Takatsuki, Haruhiko Hisada, Yao, and Takeshi Kasahara, Sakai, Japan, assignors to Marubishi Yuka Kogyo Kabushiki Kaisha, Osaka, Japan
No Drawing. Filed Sept. 9, 1971, Ser. No. 179,202
Claims priority, application Japan, July 20, 1971, 46/53,587
Int. Cl. C09k 3/28
U.S. Cl. 260—897 A                5 Claims

ABSTRACT OF THE DISCLOSURE

Highly durable flame-retardant polyolefin compositions contain from 3 to 10% based on the weight of the polyolefin of at least one magnesium dibromopropyl phosphate of the formula:

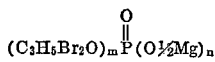

wherein $m$ and $n$ are 1 or 2 and $m+n=3$.

---

This invention relates to flame-retardant polyolefin compositions and more particularly, relates to flame-retardant polyolefin compositions containing magnesium salts of mono- or di-esters of orthophosphoric acid with dibromopropanol.

Polyolefins have not only high tenacity, low specific gravity, and excellent water-resistance, chemical-resistance and electric insulation, but high processability in molding or shaping. Therefore, they are widely used as a material for building or for electrical appliances, or as a supplementary material thereof. Polyolefins, however, have the drawback, of high inflammability.

Numerous methods have been developed for rendering polyolefins flame-retardant. Among these flame-retarding methods used up to now, the methods in which the flame-retardance is imparted by the addition of halogenated compounds and antimony oxide as flame-retardant agents into the polyolefins have been used the most widely. However, these methods require the mixing with very large amounts of the flame-retardant agents in order to render the polyolefins flame-retardant and therefore, they have the disadvantages of lowering the physical properties, for example, strength, whiteness, brilliance, electric insulation, etc., of the resultant polyolefin compositions. For the above reasons, these flame-retarding methods can not be used practically in most cases. Additionally, in the case of using liquid flame-retardant agents, these materials have the following disadvantages: the agents included in the polyolefins ooze out onto the surface of the polyolefin compositions gradually with the lapse of time so as to render the surface adhesive and these exuded flame-retardant agents fall off from the polyolefin compositions so as to reduce the flame-retarding effects. This oozing-out phenomenon is also observed in many well-known solid flame-retardant agents which have low miscibility with polyolefins.

These oozing-out and falling-off phenomena are facilitated at higher temperature. Therefore, in order to render flame-retardant the polyolefin materials, to be exposed to high temperature, it is required that they should be mixed with very large amounts of the flame-retardant agents but the resultant compositions have short lifetimes of the effects.

It is an object of this invention to provide flame-retardant polyolefin compositions which are excellent in flame-retardance and durability.

It is a further object of this invention to provide flame-retardant polyolefin compositions which comprise a small amount of a flame-retardant agent and have an excellent flame-retardance.

It is a still further object of this invention to provide flame-retardant polyolefin compositions which comprise a flame-retardant agent affecting but little the properties of polyolefins.

These objects can be achieved by the compositions according to the present invention.

The compositions according to this invention are flame-retardant polyolefin compositions comprising at least one of polyolefins and from 3 to 10% based on the weight of the polyolefin of at least one of magnesium dibromopropyl phosphate having the general formula:

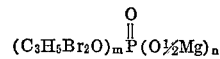

in which $m$ and $n$ are 1 or 2 and satisfy $m+n=3$.

It has been found that the magnesium dibromopropyl phosphates are excellent in miscibility with polyolefins, and can render the polyolefins extremely flame-retardant even by the addition of small amounts and moreover, even if the polyolefin compositions containing them are exposed to high temperatures for a long time, they do not ooze-out or fall off from the surface of the polyolefin materials to any appreciable extent. Accordingly, the compositions of this invention have the special merit that their flame-retardant properties do not change greatly with the lapse of time.

Polyolefins usable for the compositions of this invention may be selected from homopolymers or copolymers of ethylene, propylene, 1-butene and 1-pentene and mixtures of two or more of the polymers. Additionally, these polyolefins may include stabilizers, colorants, weatherproofing agents (ultraviolet ray absorbing agents), delustering agents, antistatic agents, extenders, other flame-retardant agents and other additives.

Magnesium dibromopropyl phosphates can be obtained by reacting an ester of orthophosphoric acid with dibromopropanol with a basic magnesium compound for example magnesium hydroxide in accordance with the following reaction equations:

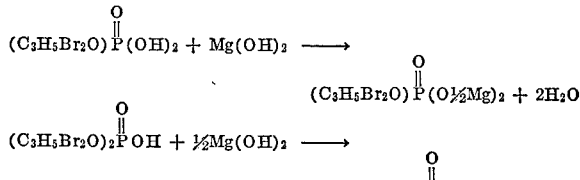

Magnesium dibromopropyl phosphate usable for this invention may be either of the two compounds obtained according to the above reactions, or may be a mixture thereof.

The polyolefin compositions according to this invention include from 3 to 10%, based on the weight of polyolefin of magnesium dibromopropyl phosphates. If the compositions include less than 3% of the flame-retardant agents, their flame-retardant properties are inadequate and if they include more than 10% of the agents, the flame-retarding effects are lowered and moreover, the physical properties, especially, the strength of the resultant compositions are reduced.

In order to produce the compositions of this invention, the usual processes for blending can be used; polyolefin powders or pellets and magnesium dibromopropyl phosphates are mixed and thereafter, the mixtures are melted and blended by means of a kneader or screw type extruder, Banbury mixer, roll mill, etc.

The compositions of this invention can be formed into any shape and the materials formed may be used as materials for building or for electrical appliances, interior articles, clothings, and other sundry goods.

The features of the flame-retardant polyolefin compositions of this invention will be more distinctly illuminated by the following examples.

EXAMPLE 1

797 g. of the mixture of mono- and di-ester of orthophosphoric acid with 2,3-dibromopropanol was synthesized by reacting 654 g. (3 mols) of 2,3-dibromopropanol with 143 g. (1 mol) of orthophosphoric acid anhydride at from 50 to 100° C. The mixture was dissolved in 250 g. of water, the solution was neutralized by gradually adding 90 g. of magnesium hydroxide disposed in 90 g. of water with cooling. A mixture of magnesium salts of mono- and di-ester of orthophosphoric acid with dibromopropanol was thus produced. The product was then dried at 130° C. and the resultant solid was finely ground.

95 parts by weight of commercial polyethylene for molding and 5 parts by weight of the powdered flame-retardant agent thus obtained were blended by means of a roll mill at 170 to 180° C. and pressed at 190° C. and thereby, molded into a flat board having 3 mm. of thickness. The molded material burned in contact with a flame but with the fire went out spontaneously immediately upon being removed from the flame. When the molded material was treated at 120° C. for a week, the decrease in the flame-retardant agent included was 5% or less, the flame-retarding effect was not changed at all and the material thus treated remained self-extinguishing.

EXAMPLE 2

5 parts by weight of the powdered flame-retardant agent prepared by the same process as described in Example 1 and 95 parts by weight of commercial polypropylene were blended by means of a roll mill at 180 to 190° C., pressed at 200° C. and thereby, molded into a flat board having 3 mm. of thickness. The molded material burned in contact with a flame but the fire went out spontaneously immediately upon being removed from the flame. When the molded material was treated at 120° C. for a week, the decrease in the flame-retardant agent included was 5% or less, the flame-retarding effect was not changed at all and the treated material remained self-extinguishing.

EXAMPLE 3

436 g. (2 mols) of 2,3-dibromopropanol was reacted with 143 g. (1 mol) of orthophosphoric acid anhydride at from 50 to 100° C., 20 g. (1.1 mols) of water was added to the reaction mixture and then the mixture was kept at 85° C. for an hour. 200 g. of water was then added to the mixture and finally, the solution was neutralized by gradually adding 120 g. of magnesium hydroxide dispersed in 100 g. of water. A mixture which had the magnesium salt of mono-ester of orthophosphoric acid with dibromopropanol as the main ingredient was thus obtained. The product was then dried at 130° C. and finely ground.

95 parts by weight of commercial polyethylene and 5 parts by weight of the powdered flame-retardant agent thus obtained were blended by means of a roll mill at 170 to 180° C., pressed at 190° C. and thereby, molded into a flat board having 3 mm. of thickness. The molded material burned in contact with a flame but the fire went out spontaneously immediately upon being removed from the flame. When the molded material was treated at 120° C. for a week, the decrease in the flame-retardant agent included was 6% or less, the flame-retarding effect was not changed at all and the treated material remained self-extinguishing.

EXAMPLE 4

5 parts by weight of the powdered flame-retardant agent prepared as described in Example 3 and 95 parts by weight of commercial polypropylene powder were blended by means of a roll mill at 180 to 190° C., pressed at 200° C. and thereby, molded into a flat board having 3 mm. of thickness. The molded material burned in contact with a flame but the fire went out spontaneously immediately upon being removed from the flame. When the molded material was treated at 120° C. for a week, the decrease in the flame-retardant agent included was 6% or less, the flame-retarding effect was not changed at all and the treated material remained self-extinguishing.

EXAMPLE 5

The powdered flame-retardant agent prepared as described in Example 1 was mixed in the ratios up to 20% (by weight) as indicated in Table 1 with commercial polyethylene and polypropylene and the mixtures were molded into flat boards by the same methods as described in Examples 1 and 2. The molded materials were then subjected to the combustion test according to ASTM D635–56T. As is evident from the results listed in Table 1, excellent flame-retarding effects were achieved by adding amounts ranging from 3 to 10% (by weight) of the flame-retardant agent according to this invention.

TABLE 1

| The added amounts of flame-retarding agent (percent by weight) | Polyethylene | Polypropylene |
|---|---|---|
| 0 | Highly flammable | Highly flammable. |
| 1 | Flammable | Flammable. |
| 2 | Low flammable | Low flammable. |
| 3 | Low flammable~self-extinguishing | Low flammable~self-extinguishing. |
| 4 | Self-extinguishing | Self-extinguishing. |
| 5 | do | Do. |
| 8 | do | Do. |
| 10 | Self-extinguishing~low flammable | Self-extinguishing~low flammable. |
| 15 | Low flammable | Low flammable. |
| 20 | do | Do. |

EXAMPLE 6

The flame-retardant agent prepared as described in Example 1 and nine commonly used flame-retardant agents were respectively blended at the rate of 5% (by weight) with polypropylene, the mixtures were molded into flat boards having 3 mm. of thickness and thereafter, the flat boards were subjected to the combustion test according to ASTM D635–56T. Further, the flat boards were heated at 120° C. for a week and thereafter, the decrease in the flame-retardant agents was determined. The results are listed in Table 2.

TABLE 2

| Flame-retardant agents (included with 5%) | Combustion test | Decrease of flame-retardant agents (120° C., a week), percent |
|---|---|---|
| The flame-retarding agent according to Example 1. | Self-extinguishing | ≲5 |
| Hexabromobenzene | Flammable | 39 |
| Diphenyl bromide (Br: 70%) | do | 96 |
| Diphenyl chloride (Cl: 60%) | do | 98 |
| Bisethylester of tetrabromobisphenol A. | do | 32 |
| Tetrabromobutane | Self-extinguishing | 99 |
| Aluminum salt of ester of phosphoric acid with dibromopropanol. | Flammable | 12 |
| Sodium salt of the above ester | do | 9 |
| Zinc salt of the above ester | do | 6 |
| Calcium salt of the above ester | do | 8 |

As is evident from Table 2, the flat board consisted of the composition of this invention has excellent self-extinguishing properties and durability but the specimens containing the usual flame-retardant agents except tetrabromobutane have not only inadequate flame-retarding properties but also greatly inferior durability. The specimen containing the tetrabromobutane has good flame-retarding effect but greatly inferior durability.

What we claim is:

1. Flame-retardant polyolefin compositions comprising at least one polyolefin and from 3 to 10% based on the weight of said polyolefin of at least one of the magnesium dibromopropyl phosphates having the general formulae:

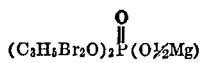

and

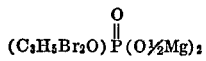

2. Flame-retardant polyolefin compositions according to claim 1, wherein polyolefin is selected from homopolymers or copolymers of ethylene, propylene, 1-butene and 1-pentene and mixtures of two or more of the above-mentioned polymers.

3. Flame-retardant polyolefin compositions according to claim 1, wherein magnesium dibromopropyl phosphate is magnesium salt of mono-ester of orthophosphoric acid with dibromopropanol.

4. Flame-retardant polyolefin compositions according to claim 1, wherein magnesium dibromopropyl phosphate is magnesium salt of di-ester of orthophosphoric acid with dibromopropanol.

5. Flame-retardant polyolefin compositions according to claim 1, wherein magnesium dibromopropyl phosphate is a mixture of magnesium salts of mono- and di-ester of orthophosphoric acid with dibromopropanol.

References Cited
UNITED STATES PATENTS

| | | | |
|---|---|---|---|
| 3,650,820 | 3/1972 | Dipietro et al. | 117—136 |
| 3,468,678 | 9/1969 | Clampitt et al. | 106—15 |
| 3,318,982 | 5/1967 | Klose et al. | 260—980 |
| 3,347,790 | 10/1967 | Meinhardt | 252—32.5 |
| 1,955,888 | 4/1934 | Nollau | 252—8.1 |

DONALD E. CZAJA, Primary Examiner

R. A. WHITE, Assistant Examiner

U.S. Cl. X.R.

252—8.1; 260—45.7 P, 896